United States Patent Office 3,005,027
Patented Oct. 17, 1961

3,005,027
ALKYL HYDRAZINES
Jean Druey, Riehen, Paul Schmidt, Therwil, and Kurt Eichenberger and Max Wilhelm, Basel, Switzerland, assignors to Ciba Pharmaceutical Products Inc., Summit, N.J.
No Drawing. Filed May 17, 1960, Ser. No. 29,598
Claims priority, application Switzerland Nov. 26, 1957
4 Claims. (Cl. 260—583)

This invention provides pentyl-(2)-hydrazine of the formula

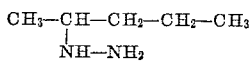

and 2-methyl-pentyl-(4)-hydrazine, their salts and a process for their manufacture.

The new compounds possess a valuable stimulating effect upon the central nervous system with an extraordinary distribution of stimulated regions of the said system. They can therefore be used for the stimulation of functions of the central nervous system, for example in the case of depression conditions of the central nervous system. Particularly useful for this purpose is the pentyl-(2)-hydrazine and its salts.

The new compounds are prepared by methods known per se. Thus, hydrazine is condensed with methyl-n-propyl ketone, or 2-methyl-pentanone-(4), respectively, and the resulting mono-substituted hydrazine converted by reduction into pentyl-(2)-hydrazine or 2-methyl-pentyl-(4)-hydrazine, respectively. Advantageously the hydrazine is employed in the form of a salt, for example hydrazine hydrochloride. The condensation to the mono-substituted hydrazine is achieved for example by simple mixing of the two reaction components, especially in molar proportions, preferably in solution, for example in water. The reduction can be carried out with nascent or catalytically activated hydrogen or with an agent providing hydrogen such as a complex metal hydride, and is preferably effected in a suitable solvent. In particular, reduction can be carried out in aqueous solution with hydrogen in the presence of a catalyst, for example finely divided platinum.

The new compounds form salts with inorganic or organic acids. As salt-forming acids are concerned, for example those forming pharmaceutically acceptable acid addition salts, such as hydrohalic acids, sulfuric acid, phosphoric acid, nitric acid, perchloric acid; aliphatic, alicyclic, aromatic or heterocyclic carboxylic or sulfonic acids, such as formic, acetic, propionic, oxalic, succinic, glycollic, lactic, malic, tartaric, citric, ascorbic, hydroxymaleic, dihydroxymaleic or pyroracemic acid; phenyl acetic, benzoic, p-aminobenzoic, anthranilic, p-hydroxybenzoic, salicylic or p-aminosalicylic acid; methane sulfonic, ethane sulfonic, hydroxy ethane sulfonic or ethylene sulfonic acid; toluene sulfonic or naphthalene sulfonic acids or sulfanilic acid. These are all pharmaceutically acceptable acids. Resulting salts can be converted in the known manner into the free bases.

The new alkyl hydrazines, their salts or corresponding mixtures thereof can be used, for example, in the form of pharmaceutical preparations. These contain the specified compounds in admixture with a pharmaceutical organic or inorganic carrier material suitable for enteral or parenteral administration. As such are concerned substances that do not react with the described compounds, for example water, gelatine, lactose, petroleum jelly, starch, magnesium stearate, talc, vegetable oils, benzyl alcohols, gums, polyalkylene glycols, cholesterol or other known medicament carriers. The pharmaceutical preparations can be made up, for example, as tablets or dragees, or in liquid form as solutions, suspensions or emulsions. If desired they are sterilized and/or contain auxiliary substances such as preserving, stabilizing, wetting or emulsifying agents. They can also contain other therapeutically valuable substances. The preparations are prepared by customary methods.

This application is a continuation in part of our copending application Nos. 775,378 filed November 21, 1958 (now abandoned) and 775,376 filed November 21, 1958 (now abandoned).

The following examples illustrate the invention:

*Example 1*

A neutrally reacting solution of 50 grams of hydrazine hydrate in 500 cc. of 2 N-hydrochloric acid is treated, with stirring and ice cooling, with 86 grams of methyl propyl ketone. Hydrogenation is then carried out at room temperature and a pressure of 19 atmospheres with 2 grams of platinum oxide as catalyst. Within one hour the quantity of hydrogen calculated for 1 mol, i.e. 22.4 liters, is taken up. Filtration with suction from the catalyst is then carried out, the filtrate is evaporated under vacuum to dryness and the residue treated with 500 cc. of concentrated sodium hydroxide solution, whereby pentyl-(2)-hydrazine separates as an oil. After separation in a separating funnel, the oil distils under a pressure of 11 mm. of mercury at 56 to 60° C.

*Example 2*

A solution of 200 grams of hydrazine hydrate in 400 cc. of 10 N-hydrochloric acid is treated, with stirring at room temperature, with 400 grams of methyl isobutyl ketone. Then 100 cc. of alcohol are introduced and stirring continued for 1 hour longer, whereby the temperature of the reaction solution rises to about 30° C. Hydrogenation is then carried out at room temperature and a pressure of 100 atmospheres with 2 grams of platinum oxide as catalyst. Within one and a half hours the quantity of hydrogen calculated for 4 mols, i.e. 89.6 liters, is taken up. Filtration with suction from the catalyst is then carried out, the filtrate is adjusted to pH=4 with 2 N-hydrochloric acid and the solution is evaporated under vacuum until crystallization commences. The residue is treated with 500 cc. of concentrated sodium hydroxide solution, with ice cooling. Solid sodium hydroxide is further added until an oil separates. This is decanted and distilled. Resulting 2-methyl-pentyl-(4)-hydrazine distills under a pressure of 16 mm. of mercury at 59 to 61° C. Its very hygroscopic monohydrochloride melts at 61–63° C.

What is claimed is:
1. Pentyl-(2)-hydrazine.
2. Salts of pentyl-(2)-hydrazine and pharmaceutically acceptable acids.
3. 2-methyl-pentyl-(4)-hydrazine.
4. Salts of 2-methyl-pentyl-(4)-hydrazine and pharmaceutically acceptable acids.

References Cited in the file of this patent
Westphal: Ber., volume 74, pp. 771–2 (1941).